Dec. 3, 1935.  A. A. THOMAS  2,022,903
HOUSEHOLD CABINET FOR MOTION PICTURE PROJECTION
Original Filed July 20, 1929
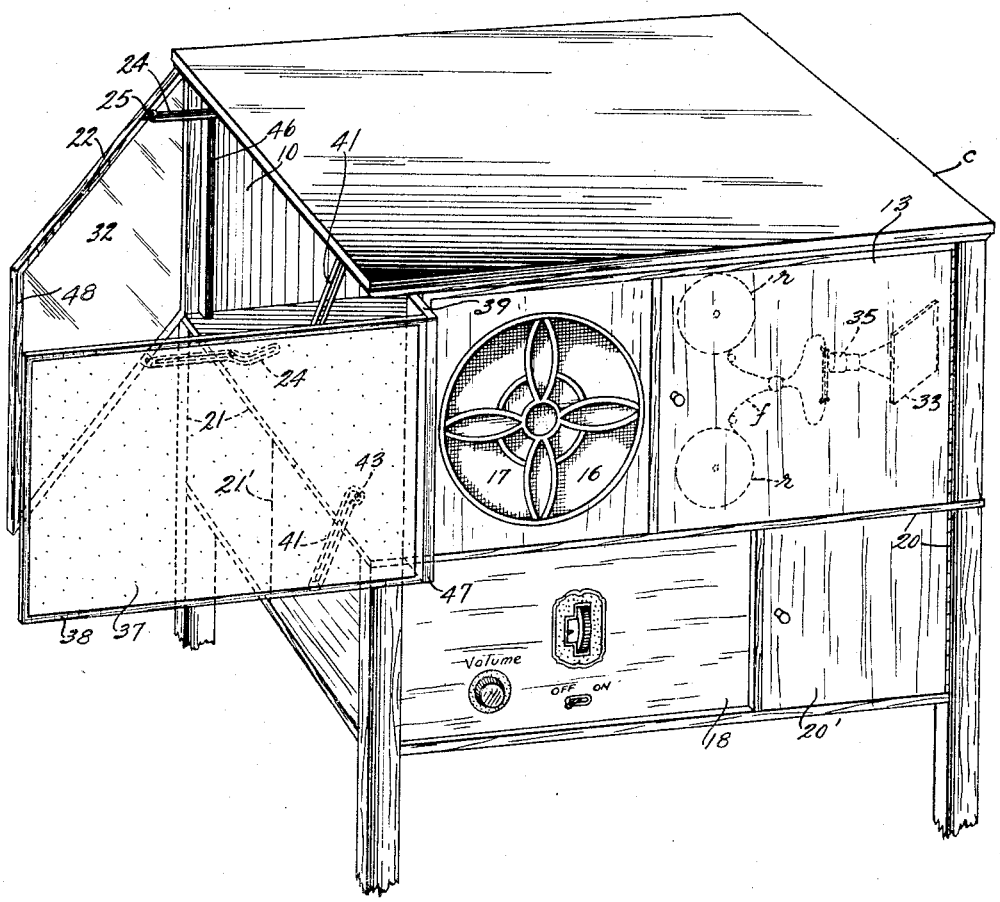
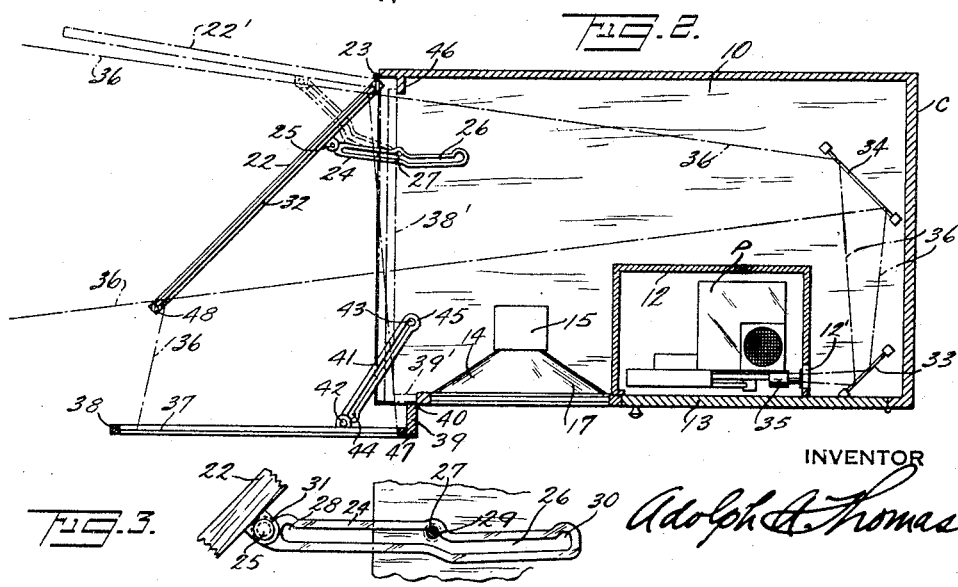
INVENTOR
Adolph A. Thomas Patented Dec. 3, 1935

2,022,903

UNITED STATES PATENT OFFICE 2,022,903

HOUSEHOLD CABINET FOR MOTION PICTURE PROJECTION

Adolph A. Thomas, New York, N. Y., assignor to Radio Corporation of America, a corporation of Delaware Original application July 20, 1929, Serial No. 379,668. Divided and this application December 23, 1930, Serial No. 504,271

14 Claims. (Cl. 88—24)

My invention relates to the art of motion picture projection, and its object is to provide a household cabinet complete in itself for the projection of motion pictures in the home. For this purpose I have devised a cabinet having a motion picture screen of adequate size, which is normally invisible but is readily adjusted into operative relation to a projector mounted in the cabinet. In a preferred form of my new apparatus, the screen is hinged at one end of the cabinet and may be swung forward to project beyond the cabinet substantially parallel with the front panel. A system of mirrors interposed between the projector and the screen provides a light path of such length that the picture practically fills the screen. One of the mirrors is carried by a hinged panel which normally covers the screen and forms an outer wall of the cabinet structure. This movable mirror may be swung back out of the light path to permit projection on a larger screen placed at the proper distance from the cabinet. I may also install a radio receiver and a loudspeaker in the cabinet, and provision is made for the storage of film reels.

The novel features and practical advantages of my invention will be understood from a description of the accompanying drawings, in which—

Fig. 1 illustrates a self-contained radio and motion-picture projection cabinet constructed in accordance with my invention, the screen being shown in operative position;

Fig. 2 is a sectional plan view of the cabinet; and

Fig. 3 shows an enlargement of a mirror stop used in the cabinet;

A cabinet C of suitable design has a horizontal projection chamber 10 which contains a motion picture projector indicated as a whole by P. If desired, the projector P may be enclosed in a fireproof case or housing 12, and a hinged door 13 permits ready access to the projector for inserting and removing the films. The chamber 10 may also contain a suitable loudspeaker, which in the present instance is represented by a cone diaphragm 14 actuated by a driving unit 15. The diaphragm 14 is directly open to the outer air through an aperture in the front panel 16, which may carry an ornamental screen 17. The rear of loudspeaker 14 may be closed off to the outer air, or it may be open to chamber 19, which acts as a sound amplifier. Below the loudspeaker 14 is a radio receiver 18 of any approved make or design, but I want it understood that this apparatus may be omitted from the cabinet when the latter is used only for motion picture projection. A front compartment 20 and a side compartment 21 may be used for storing films or other paraphernalia. These compartments are normally closed by hinged doors or sliding panels 20' and 21'.

The projection chamber 10, which extends the entire length of the cabinet, is normally closed at one end by an outer panel 22 hinged at 23 along its rear edge, so that it may be swung out to predetermined position. A pair of slotted bars or links 24 are hinged to the top and bottom of panel 22 on pins 25. A slot 26 in each link 24 engages a pin 27 fixed to the top and bottom walls of chamber 10, and these slots are preferably formed with lateral offsets which provide three locking notches 28, 29 and 30, as clearly shown in Fig. 3. A coil spring 31 mounted on the pivot pin 25 of each locking bar 24 normally forces the rear edge of slot 26 against the fixed stop 27. When the hinged panel 22 is in normal or closed position, the stop 27 rests in notch 28. When the panel is moved into projecting position, as shown in Figs. 1 and 2, the intermediate notch 29 of link 24 engages the fixed stop 27. It is also possible to swing panel 22 into the extreme rear position indicated by dotted lines 22' in Fig. 2, and in that case the pin 27 engages the last notch 30. The shape of the notches in links 24 is such that the pin 27 locks the panel firmly in adjusted position and yet permits swinging of the panel to any other position by the application of a little pressure.

The inner face of panel 22 carries a mirror 32 which receives the light from projector P by reflection from a pair of fixed mirrors 33 and 34 at the right end of chamber 10. The mirror 33 is directly in line with the optical system 35 of projector P, there being an opening 12' in housing 12 for the passage of the light rays. The film is wound on reels r which are arranged in a vertical plane at the front of chamber 12, so as to be fully accessible when the door 13 is opened. The dash-dot lines 36 indicate diagrammatically the path of light issuing from the projector and reflected by the mirrors 33, 34 and 32. The angular position of mirror 32 is such that it throws the light on a motion picture screen 37 mounted in a frame 38, which is attached to a narrow vertical panel 39 hinged to the cabinet at 40. The screen frame 38 is firmly held in operative position by any practical means, such as one or two slotted links 41 pivoted to the frame at 42 and adapted to engage a fixed stop 43 in chamber 10. The longitudinal slot in each link 41 terminates in lateral recesses or notches 44 and 45, which are snapped by a coil spring on pivot pin 42 into releasable locking engagement with stop 43, as explained in connection with the holding links 24 of panel 22. When the screen frame 38 is swung fully out, the pin or stop 43 engages the rear notch 45 of link 41, whereby the screen 37 is firmly held in correct projecting position relative to mirror 32. When the frame 38 is swung back to normal position in the cabinet, the front notch 44 of link 41 snaps into engagement with stop 43 and the rear edge of the frame rests against a vertical strip 46 attached to the rear wall of the cabinet.

The dotted outlines 38' and 39' in Fig. 2 indicate the normal position of screen frame 38 and supporting panel 39. After the frame 38 has been pushed back, the mirror panel 22 may be swung forward to closed position. The outer edge 47 of panel 39 may form a stop for the front edge 48 of panel 22 when the latter is closed. It is seen from this that when the panels 22 and 39 are in normal closed position, they form part of the outer cabinet structure, and the mirror 32 and screen 37 are invisible. As seen in Fig. 2, the projection path 36 is considerably longer than the width of the cabinet, whereby the pictures are thrown on screen 37 with the proper degree of magnification. The dimensions of the cabinet are so calculated that the screen 37 is just the right size for the pictures. When a 16 mm. film is used in projector P, the screen should preferably not be larger than 3½ by 5 feet. For larger projection, the mirror panel 22 is moved out of the way into position 22', so that the light is thrown directly from mirror 34 on a screen suitably located at a distance from the cabinet. The screen 37 may be ground glass, a sheet of light-colored fabric (such as silk, cheesecloth, etc.) held taut in the frame, or any other translucent material suitable for the purpose.

Although I have shown and described a specific construction, the various features of my cabinet may be embodied in other forms than herein set forth. Changes and modifications will probably occur to the skilled mechanic without departing from the scope of the invention as defined in the appended claims.

This case is a division of my original application filed July 20, 1929, Serial Number 379,668, which issued as Patent No. 1,936,043, November 21, 1933.

I claim as my invention:

1. A cabinet containing a motion picture projector, said cabinet comprising two panels which normally form part of the outer cabinet structure, means for pivotally mounting said panels on said cabinet for independent adjustment, a screen carried by one panel and a mirror carried by the other panel, said panels being normally in such position that said screen and mirror are concealed on the cabinet, and means for swinging said panels to move said mirror and screen to positions outside the cabinet in operative relation to said projector, so that the pictures are reflected by the mirror onto the screen.

2. A cabinet containing a motion picture projector having a horizontal projection path through the cabinet, a frame hinged to said cabinet at one end thereof and normally arranged transversely of the cabinet, said frame being adapted to be swung forward to a predetermined position substantially parallel with the front cabinet wall, a screen carried by said frame, an end panel hinged to said cabinet and normally covering said screen, a mirror on said panel, means for holding said mirror panel in predetermined angular relation to the screen when the latter is in forward position, and means in said cabinet for reflecting the light of said projector to said mirror which is arranged to throw the light on said screen.

3. A cabinet having a compartment at the front, a vertical panel normally closing the front of said compartment and movable to open position, a motion picture projector mounted in said compartment and having its film reels at the front of the compartment in a vertical plane substantially parallel with the front of the cabinet, whereby said reels are fully exposed for removal and insertion of film when said panel is open, a translucent screen adjustably mounted on said cabinet and normally in concealed position thereon, means whereby said screen is movable to an operative position outside the cabinet and is supported thereon in a plane substantially parallel with the vertical plane of said reels, and means for throwing the projected pictures to the back side of said translucent screen when the latter is in operative position, said screen being viewed from the front of the cabinet.

4. A cabinet having a vertical compartment at the front, a vertical panel normally closing the front of said compartment and movable to open position, a motion picture projector mounted in said compartment and having its film reels at the front of the compartment in a vertical plane substantially parallel with the front of the cabinet, whereby said reels are fully exposed for removal and insertion of film when said panel is open, a translucent screen adjustably mounted on said cabinet and adapted to be moved to a position outside the stationary framework of the cabinet, said screen being normally in a concealed position on the cabinet, and means for throwing the projected pictures to the back side of said translucent screen which is viewed from the front of the cabinet.

5. A cabinet having a compartment at the front, a vertical panel normally closing the front of said compartment and movable to open position, a motion picture projector mounted in said compartment and having its film reels at the front of the compartment in a vertical plane substantially parallel with the front of the cabinet, whereby said reels are fully exposed for removal and insertion of film when said panel is open, a mirror and a screen mounted on said cabinet and normally invisible, vertical pivot connections for independently moving said mirror and screen horizontally to positions outside the cabinet so that the light from said projector is thrown to the mirror whence it is reflected to the screen, and means whereby the light from said projector is thrown on said mirror in a substantially horizontal path.

6. A cabinet having a compartment at the front, a vertical panel normally closing the front of said compartment and movable to open position, a motion picture projector mounted in said compartment and having its film reels at the front of the compartment in a vertical plane substantially parallel with the front of the cabinet, whereby said reels are fully exposed for removal and insertion of film when said panel is open, means for directing the light horizontally out of the cabinet, a screen mounted on a vertical pivot on said cabinet and adapted to be swung horizontally to a position outside the stationary framework of the cabinet for receiving the projected pictures, and means whereby said screen is normally held in a concealed position on the cabinet.

7. A cabinet having a compartment, a motion picture projector mounted in said compartment, said projector having film reels supported in a vertical plane, a screen adjustably mounted on said cabinet and normally in concealed position thereon, means for supporting said screen outside of said cabinet in a vertical plane substantially parallel with the plane of said reels, and means for throwing the film pictures on said screen in a horizontal projection path.

8. A cabinet having a compartment, a movable front panel on said cabinet normally closing said compartment, a motion picture projector mounted in said compartment and having two film reels arranged in a vertical plane at the front of said compartment, whereby said reels are readily accessible when said panel is moved to open the compartment, a mirror mounted on a vertical pivot on said cabinet and movable to an operative position outside the cabinet, said mirror being normally in concealed position on the cabinet, means for throwing light rays from said projector to said mirror when the latter is in operative position, a screen mounted on a vertical pivot on said cabinet and movable to an operative position outside the cabinet, said screen being normally in concealed position on the cabinet, and means for supporting said screen to receive the projected light from the mirror when both of these parts are in operative position on the cabinet.

9. A cabinet having a compartment, a motion picture projector mounted in said compartment and having film reels supported in a vertical plane, a screen mounted on a vertical pivot on said cabinet and normally in concealed position thereon, means for supporting said screen outside of said cabinet in substantially upright position parallel with the length of the cabinet, and means for throwing the film pictures on said screen when the latter is in operative position outside of the cabinet, said means including a mirror movable to a position outside the cabinet and arranged to receive the light rays from said projector in a substantially horizontal path.

10. A cabinet having a front panel and a screen to one side of said panel, a motion picture projector mounted in said cabinet behind said panel in such position as to afford an unobstructed space on two sides of the projector for the passage of light therefrom in a horizontal path, and means for directing the light from said projector around the same and through said unobstructed space to the screen, whereby the horizontal projection path is longer than the straight distance between the projector and the screen.

11. A cabinet provided at one end with a screen arranged substantially parallel with the front of the cabinet, a motion picture projector mounted in the front part of said cabinet at the other end thereof and having an optical outlet which throws the light rays horizontally in a direction toward said other end of the cabinet, the space back of said projector being unobstructed, and means for directing the light from said projector outlet in a horizontal path around and behind the projector and to said screen, whereby the projection path is longer than the straight distance between said projector outlet and the screen.

12. A cabinet containing a motion picture projector, a translucent screen pivoted on said cabinet at the front thereof and normally invisible, a mirror pivoted on said cabinet at the rear thereof and also normally invisible, said screen and mirror being pivotally adjustable to positions outside the cabinet, so that the screen is in front of the mirror to receive the projector light from the rear when these two parts are in operative position, and means for automatically stopping said screen and mirror in correct angular relation to each other when they are moved to operative position.

13. A cabinet containing a motion picture projector having a horizontal projection path through the cabinet, a swinging panel mounted on said cabinet and normally forming an end wall thereof, a screen mounted on said cabinet independently of said panel and normally arranged within the outer confines of the cabinet structure in close parallel relation to said panel, whereby said screen and panel are normally a flat structure occupying a shallow space in the cabinet, means whereby said screen is adjustable to extend beyond one end of the cabinet substantially parallel with the front panel thereof, and a system of mirrors for throwing the light from said projector on said screen when the panel and the screen are in extended position, one of said mirrors being mounted on said panel.

14. A cabinet containing a motion picture projector accessible from the front of the cabinet, a screen mounted on said cabinet at the front thereof and to one said of said projector, the space behind said projector and screen being free for the passage of light, and means for directing the light beam from the projector around the latter and through said space to the screen, whereby the length of the projection path is greater than the length of the cabinet.

ADOLPH A. THOMAS.